(12) United States Patent
Kuttyamu

(10) Patent No.: US 12,176,834 B2
(45) Date of Patent: Dec. 24, 2024

(54) ENERGY EFFICIENT INDUCTION MOTOR

(71) Applicant: PAL-K Dynamics Inc., Dover, DE (US)

(72) Inventor: Kunjimon Thekypeedikayil Kuttyamu, Kerala (IN)

(73) Assignee: PAL-K Dynamics Inc., Dover, DE (US)

( * ) Notice: Subject to any disclaimer, the term of this patent is extended or adjusted under 35 U.S.C. 154(b) by 0 days.

(21) Appl. No.: 17/456,841

(22) Filed: Nov. 29, 2021

(65) Prior Publication Data

US 2022/0224267 A1 Jul. 14, 2022

(30) Foreign Application Priority Data

Jan. 9, 2021 (IN) .............................. 202141001079

(51) Int. Cl.
*H02P 23/10* (2006.01)
*H02P 23/26* (2016.01)

(52) U.S. Cl.
CPC .............. *H02P 23/10* (2013.01); *H02P 23/26* (2016.02); *H02P 2201/15* (2013.01); *H02P 2207/01* (2013.01)

(58) Field of Classification Search
CPC ...... H02P 23/26; H02P 23/10; H02P 2207/01; H02P 2201/15; H02P 9/46; H02P 21/12;

(Continued)

(56) References Cited

U.S. PATENT DOCUMENTS 4,341,984 A 7/1982 Parker et al.
4,382,223 A 5/1983 Hedges
(Continued)

FOREIGN PATENT DOCUMENTS

CN 1323091 A 11/2001
CN 201663527 U 12/2010
(Continued)

OTHER PUBLICATIONS

E. da Silveira et al., "Direct on Line Starting Induction Motor with Thyristor Switched Capacitor Based Voltage Regulation," 2009 Brazilian Power Electronics Conference, DOI:10.1109/COBEP.2009. 5347707, Dec. 4, 2009, fig. 3, section II, pp. 1124-1125.

(Continued)

*Primary Examiner* — Said Bouziane
(74) *Attorney, Agent, or Firm* — Knobbe, Martens, Olson & Bear, LLP

(57) ABSTRACT

The invention relates to an energy efficient induction motor comprising a stator, a main winding of the stator for generating a rotating magnetic field (RMF), and a rotor disposed to rotate relative to the main winding due to the RMF. The stator comprises additional winding(s) for producing an alternating EMF which is induced in the one or more additional windings due to the rotation of the rotor. The alternating EMF produced in the one or more additional windings is fed back simultaneously to the main winding throughout the complete rotation cycle of the rotor through an electronic control unit coupled to the stator, producing a resultant AC output power that is fed continuously to the main winding.

16 Claims, 10 Drawing Sheets

(58) Field of Classification Search
CPC .. H02K 17/16; H02K 53/001; B60L 2220/12; Y02T 10/64
See application file for complete search history.

(56) References Cited

U.S. PATENT DOCUMENTS

| | | | |
|---|---|---|---|
| 4,414,499 | A | 11/1983 | Hedges |
| 4,636,702 | A | 1/1987 | Hedges |
| 4,864,212 | A | 9/1989 | Parker |
| 6,489,742 | B2 | 12/2002 | Lumsden |
| 9,041,328 | B2 | 5/2015 | Richards |
| 2002/0079859 | A1 | 6/2002 | Lumsden |
| 2002/0149331 | A1 | 10/2002 | Marcinkiewicz |
| 2007/0164701 | A1 | 7/2007 | Wu |
| 2017/0141633 | A1* | 5/2017 | Atalla ............... H02P 25/22 |
| 2019/0379312 | A1 | 12/2019 | Sakai |
| 2022/0224267 | A1 | 7/2022 | Kuttyamu |

FOREIGN PATENT DOCUMENTS

| | | |
|---|---|---|
| DE | 102004041743 A1 | 3/2006 |
| IN | 202141001079 A | 7/2022 |
| JP | H0923637 A | 1/1997 |
| TW | 201815037 A | 4/2018 |
| TW | 201916551 A | 4/2019 |
| WO | WO2019/111145 A1 | 6/2019 |
| WO | WO2022/149155 A1 | 7/2022 |
| WO | WO2023/012825 A1 | 2/2023 |

OTHER PUBLICATIONS

Written Opinion of PCT Application No. PCT/IN2021/051145, dated Mar. 25, 2022, in 8 pages.
Written Opinion of PCT Application No. PCT/IN2022/050696, dated Nov. 9, 2022, in 5 pages.

\* cited by examiner

ENERGY EFFICIENT INDUCTION MOTOR

CROSS-REFERENCE TO RELATED APPLICATIONS

This application claims the benefit of Indian Application No. 202141029315, filed Jun. 30, 2021, and Indian Application No. 202141001079, filed Jan. 9, 2021, each of which is hereby incorporated by reference in its entirety.

TECHNICAL FIELD

The systems and techniques disclosed herein relate to an energy efficient induction motor, and more specifically to an induction motor which consumes less current, compared to a conventional motor of the same capacity, by harvesting and manipulating the EMF generated in the stator windings, thus supplementing a major part of the power requirements for driving the motor.

BACKGROUND

With the drastic increase in energy demand, various sectors, industrial or otherwise are looking to adopt sustainable forms of energy and to leverage renewable sources of energy. This is coupled with the need to provide energy efficient devices that manage, and conserve energy/power generated, to be on par with the energy requirements and demands.

With advancements in technology, electric motors have been used in industries as a main driving power in various applications, which demand excessive use of energy resources. Specifically, induction motors such as the three-phase induction motors are predominantly used in the industrial and agricultural sectors and these motors consume 65% of the total energy produced. Thus, there is a need to save a substantial amount of energy compared to the standard motors currently in use. Also, there is a need to reduce the running cost of such motors with improved efficiency to design an energy efficient motor.

There are basically two types of induction motor depending upon the type of input power supply to the motor and a type of rotor. Based on the type of input power supply, induction motors are classified as a single-phase induction motor and a three-phase induction motor. Based on the type of rotor, induction motors are classified as a squirrel cage motor and a slip ring motor or wound type.

The following is illustrative of the working principle of an inductor motor. When the stator winding of the induction motor is fed with an AC input power supply, alternating flux is produced around the stator winding due to the AC input power supply. This alternating flux revolves with synchronous speed. The revolving flux is referred to as the "Rotating Magnetic Field" (RMF).

The relative speed between the stator RMF and rotor conductors causes an induced emf in the rotor conductors, in accordance with Faraday's law of electromagnetic induction. The rotor conductors are short circuited, and hence rotor current is produced due to the induced emf. Because of their operation mechanism, such motors are called as induction motors. This is similar to the action that occurs in transformers and hence induction motors are also referred to as rotating transformers.

The induced current in the rotor also produces an alternating flux around it. This rotor flux lags behind the stator flux. The direction of the induced rotor current, according to Lenz's law, is such that it will tend to oppose the cause of its production. As the cause of production of the rotor current is the relative velocity between the rotating stator flux and the rotor, the rotor will try to catch up with the stator RMF. Thus, the rotor rotates in the same direction as that of the stator flux to minimize the relative velocity. However, the rotor never succeeds in catching up the with the synchronous speed of the rotating stator flux or the RMF. This is the basic working principle of both a single-phase and a three-phase induction motor.

In a three-phase induction motor, the three-phase supply is used to balance the consumption of high current. Hence, the three-phase supply is required to run an induction motor with a 3 HP rating and more.

Energy efficiency of electric motors especially the induction motors is a highly researched area. By increasing the efficiency of induction motors, it is possible to conserve tremendous amounts of energy. It is difficult to achieve industrial efficiency standards by using conventional design approaches for designing the induction motors.

In the currently existing high efficiency induction motors, design changes are implemented by incorporating high-quality core and winding material to enhance the operating efficiency of the motor. Such design changes are not cost-effective. In the recent past, significant work and investment has been made on the energy-saving side instead of using high-quality material, with efforts being made to improve the electrical current efficiency of the electric motor by way of various design modifications.

In many cases, squirrel cage induction motors are preferred for fixed speed applications. However, due to predominant winding losses, current induction motors with an optimum efficiency are not commercially available. Use of amorphous core and copper rotor bars are other solutions that have been implemented for increasing efficiency, however, such solutions result in overall increase in cost and its implementation industry wide may not be feasible.

CN201663527U relates to an electric drive system design. An electric forklift alternating current drive system is a cage induction motor. A three-phase winding is placed in a slot in the inner circumference of a stator. A closed rotor generating rotary magnetic field induction generates current. The three-phase winding space of the electric forklift alternating current drive system is arranged according to 120-degrees potential difference. The rotor type is that a squirrel-cage rotor is formed by a cast aluminum strip in a rotor outer edge slot. After constant voltage frequency analogy control uses sine Pulse Width Modulation (PWM) and a DC/AC inverter for inversion, the voltage is 48V. The fundamental frequency of the electromotor is identical with the frequency of sine wave reference voltage. The elements required by an alternating current electromotor are greatly reduced, no easily damaged parts need regular replacement, and maintenance is nearly not necessary. Compared with a direct current electromotor, the electromotor is more efficient, firmer and more durable.

U.S. 4,414,499A discloses a motor protecting improved energy economizer for induction motors. A standard, unmodified AC induction motor has its stator winding energized from a sine wave source through a signal-responsive wave modifier operative to control the portion of each cycle of the sine wave which is coupled from said source to the stator winding. An improved motor current demodulator, responsive to efficiency-related parameters and excessive stator winding inrush current each time said current increases from zero, produces signals for controlling the wave modifier, thereby to maintain optimum motor efficiency with varying motor loads and power source variations, and the signals also control a motor protector circuit which inhibits said wave modifier thereby to deenergize said stator winding under excessive input current conditions, excessive motor temperature or a potentially damaging combination thereof.

U.S. Pat. No. 4,382,223A relates to a voltage and frequency-controlled AC wave modifier. A standard, unmodified AC induction motor has its stator winding energized from a sine wave power source through a signal-responsive wave modifier operative to control the portion of each cycle of the sine wave which is coupled from said source to the stator winding. Load detecting means, comprising a comparatively small AC generator coupled to the rotor of the motor, produces a control signal, varying with variations in the load on the motor, for controlling the wave modifier to increase the field density of the stator winding with increase in load on the motor, and to decrease the field density of the stator winding with decrease in load.

U.S. Pat. No. 4,864,212A discloses an energy economizing AC power control system for energizing an induction motor. Here it describes a sine wave power source connected through a TRIAC to a control system with a gate electrode which is energized by a train (sequence) of sawtooth-shaped control signals having a repetition rate which is twice the frequency of the sine wave power source for providing short bursts of energy to decrease total power input for low power requirements at low fixed rates for variable rates of low-speed operation.

U.S. Pat. No. 4,341,984A discloses an electronic commutation for direct current electric motors. A direct current electric motor comprises a stator consisting of a plurality of coils interconnected to one another, and a plurality of gate controlled solid state rectifiers responsive to forced commutation below a particular rpm and self-commutation above said rpm which are connected to the junctions of the coils for selectively conducting current into and out of the stator coil junctions in dependence upon which of said rectifiers is rendered operative. This produces a plurality of stator poles which are angularly displaced from the poles of the rotor of the motor and which shift in position as the rotor rotates. A plurality of trigger assemblies are provided for controlling the energization of the various gate electrodes, each of said trigger assemblies comprising a pick-up coil which forms a portion of a frequency selective circuit whose resonance frequency varies in dependence on the position of a magnetic element that is moved relative to the pick-up coils as the rotor rotates. A sine wave oscillator is coupled to the frequency selective circuits in the trigger assemblies, the oscillator being operative to produce either of two different output frequencies, and an electronic switch responsive to the speed of rotation of the rotor selectively changes the output frequency of the oscillator. One of these frequencies induces trigger assembly operation at all rotor positions and advanced SCR trigger timing for reliable starting and very low speed operation. The other frequency retards SCR trigger timing for most efficient motor running at moderate and high speeds.

U.S. Pat. No. 4,636,702A discloses an energy economizer controlled-current start and protection for induction motors. This document describes a sample transformer operative to generate a voltage pulse related to inrush-current parameters for control of portions of sine waves of power input to stator windings for diminishing electrical current to a motor during low loading. It is limited further to a "manually settable means" for selecting a maximum value of motor torque during start mode of operation.

U.S. Pat. No. 6,489,742B2 discloses an efficiency-maximization motor controller that includes a use method has power conveyance to an induction motor with a digital signal processor (DSP) that calculates and optimizes supply of current for existent motor loading from a power supply and mains voltage through a control element. The control element can include a standard TRIAC, a field-effect transistor, an insulated gate bipolar transistor, a three quadrant TRIAC or other select control element. Digital calculation and motor-control feedback of current requirements for motor loading and other motor parameters are calculated in millionths of seconds to provide motor-current optimization for all motor-use conditions. Calculation of motor-load requirement for current and supply of that current are effectively simultaneous.

Accordingly, there exists a need for an energy efficient induction motor that will consume less current compared to any conventional motor of the same capacity and efficiently harvest the power generated by the motor for supplementing a major part of the power requirements for driving the motor.

Limitations and disadvantages of conventional and traditional approaches will become apparent to one of ordinary skill in the art, through comparison of described systems with some aspects of the present invention, as set forth in the remainder of the present application and with reference to the drawings.

SUMMARY

The principal object of this invention is to develop an energy efficient induction motor which consumes less current, compared to the conventional motor of the same capacity, to supplement a major part of the power requirements to run the motor and that which can run by a single-phase main AC power supply instead of a three-phase main AC power supply for any output requirement, without compromising on the input power requirement.

Another object of this invention is to develop an energy efficient induction motor comprising an exclusively designed electronic module coupled with a tailor-made stator winding design, best suited for ensuring higher current efficiency.

A further object of the invention is to develop an energy efficient induction motor, wherein the stator windings of the induction motor are continuously supplied resultant power due to an alternating EMF generated in the stator windings during the complete rotation cycle of the rotor, thus the alternating EMF (generated EMF) serving as a major source of supply power during the continuous running of the motor.

A further object of this invention is to design a single-phase induction motor that has lower electrical, magnetic and heat losses as compared to the three-phase motor for the same output requirement. Further, magnetic and heat losses are less as compared to the three-phase motor of same output power requirement.

A further object of this invention is to design an energy efficient induction motor which can be manufactured industrially and that which is cost-effective, so that it is widely affordable to the industrial and agricultural sector, for extensive applicability.

An energy efficient induction motor is disclosed which consumes less current, compared to a conventional motor of the same capacity as shown in and/or described in connection with, at least one of the figures, as set forth more completely in the claims.

The energy efficient induction motor includes a stator comprising a main winding for generating a rotating magnetic field (RMF) upon providing a main AC power supply to the main winding of the stator and a rotor disposed to rotate relative to the main winding of the stator due to the RMF. The stator further includes one or more additional windings for producing an alternating EMF which is induced in the additional winding due to the rotation of the rotor. The alternating emf produced in the one or more additional windings is then harvested, manipulated and fed back simultaneously to the main winding of the stator throughout the complete rotation cycle of the rotor through an electronic control unit (ECU) coupled to the stator. The energy thus produced during the rotation of the rotor meets a major part of the energy requirement of the induction motor, as the motor partly functions as a generator.

The alternating EMF produced in the one or more additional windings is fed to the ECU. The ECU includes a rectifier circuit for converting AC voltage of the main AC power supply and the alternating EMF produced in the one or more additional windings to respective DC powers. A resultant DC power is obtained by adding the respective DC powers.

The resultant DC power is then converted to a resultant AC output power by an inverter circuit in the ECU. The ECU includes a Variable Frequency Drive (VFD) control module configured to vary voltage and frequency of the resultant AC output power.

The ECU also includes a frequency synchronization circuit configured to synchronize the frequency of the resultant AC output power with the frequency of the main AC power supply. At this stage, the ECU may disconnect the direct main AC power supply to the stator via a disconnect switch and the stator is continuously supplied only with the resultant AC output power by the ECU.

These and other features and advantages of the present invention may be appreciated from a review of the following detailed description of the present invention, along with the accompanying figures in which like reference numerals refer to like parts throughout.

DETAILED DESCRIPTION

Figure 1:
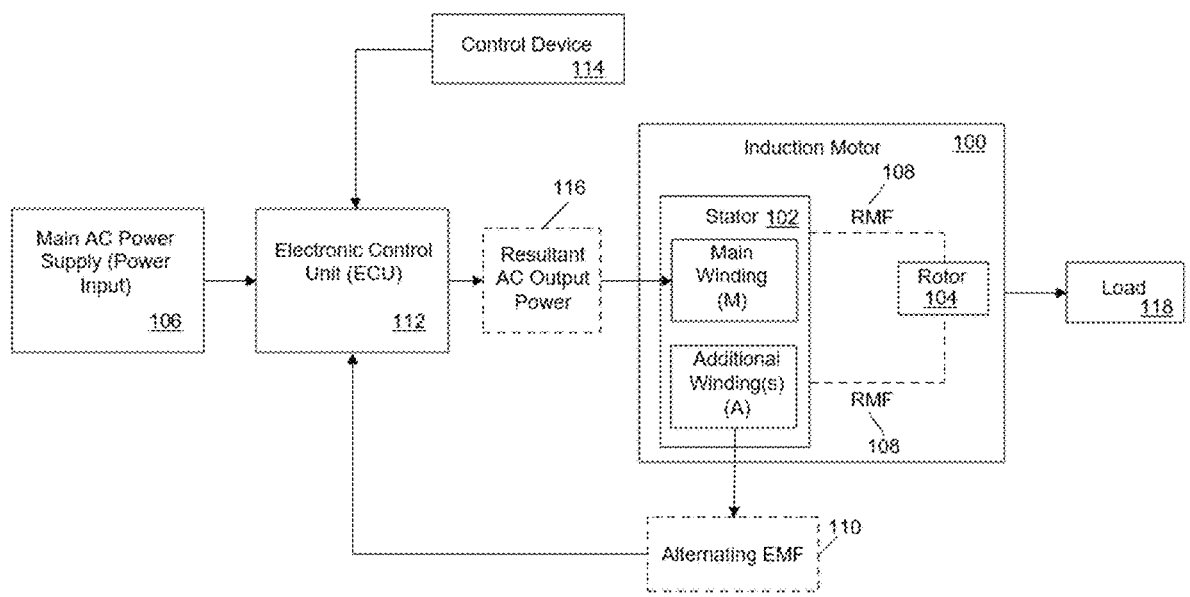
FIG. 1 is a schematic depicting various components and working of an energy efficient induction motor in accordance with an exemplary embodiment of the invention.

The following described implementations may be found in the disclosed energy efficient induction motor that includes a stator comprising a main winding for generating a rotating magnetic field (RMF) upon providing a main AC power supply to the main winding of the stator and a rotor disposed to rotate relative to the main winding of the stator due to the RMF. The stator further includes one or more additional windings for producing an alternating EMF which is induced in the one or more additional windings due to the rotation of the rotor. The alternating emf produced in the one or more additional windings is then harvested, manipulated and fed back simultaneously to the main winding of the stator throughout the complete rotation cycle of the rotor through an electronic control unit (ECU) coupled to the stator. The energy thus produced during the rotation of the rotor meets a major part of the energy requirement of the induction motor, as the motor partly functions as a generator.

The alternating EMF produced in the one or more additional windings is fed to the ECU. The ECU includes a rectifier circuit for converting AC voltage of the main AC power supply and the alternating EMF produced in the one or more additional windings to respective DC powers. A resultant DC power is obtained by adding the respective DC powers.

The resultant DC power is then converted to a resultant AC output power by an inverter circuit in the ECU. The ECU includes a Variable Frequency Drive (VFD) control module configured to vary voltage and frequency of the resultant AC output power.

The ECU also includes a frequency synchronization circuit configured to synchronize the frequency of the resultant AC output power with the frequency of the main AC power supply. At this stage, the ECU may disconnect the direct main AC power supply to the stator via a disconnect switch and the stator is continuously supplied only with the resultant AC output power by the ECU.

In accordance with an embodiment, the ECU includes a microprocessor configured to compute a phase difference in voltage and current by measuring a time difference between voltage peak and current peak, upon loading the induction motor.

The ECU includes a capacitor bank comprising a plurality of capacitors, each capacitor of the plurality of capacitors having its own value of capacitance. The capacitor bank balances a load of the induction motor and stabilizes power input to the induction motor and power factor (PF) of main power line. The capacitor bank comprises a plurality of capacitors of varying capacitance based on a quantum of load the induction motor is subjected to. The quantum of load is reflected in terms of amperage measured by a current transformer (CT) coil in the ECU.

The ECU further includes a TRIAC for enabling switching (ON/OFF) functionality to select a capacitor of the plurality of capacitors from the capacitor bank for providing power to the induction motor based on load requirements of the induction motor. The ECU adds the required value of capacitance from the capacitor bank by switching on the TRIAC in the ECU. As the load increases, the value of the capacitance will be increased. When the load is changed, the ECU will change the capacitance value in the capacitor bank by switching the TRIAC.

In accordance with an embodiment, the switching functionality of the TRIAC is controlled by a control device. The control device is either located within the ECU or is external to the ECU. The control device may include, but is not limited to, a microcontroller, a digital signal processor (DSP), a microprocessor or a network operated computing device.

FIG. 1 is a schematic depicting various components and working of an energy efficient induction motor in accordance with an exemplary embodiment of the invention. Referring to FIG. 1, there is shown an induction motor 100 comprising a stator 102 and a rotor 104, a main AC power supply 106, a main winding (M) of the stator 102, one or more additional windings (A) of the stator 102, a rotating magnetic field (RMF) 108 generated in the main winding (M), an alternating EMF 110 produced in the one or more additional windings (A), an electronic control unit (ECU) 112, a control device 114, a resultant AC output power 116 and a load 118 of the induction motor 100.

The stator 102 comprises the main winding (M) and the one or more additional windings (A). Respective terminal ends of the main winding (M) and the additional winding (A) are connected to the ECU 112.

The main winding (M) of the stator 102 generates the RMF 108 upon connecting the main AC power supply 106 to the main winding (M) to provide the power input.

The rotor 104 is disposed to rotate relative to the main winding (M) of the stator 102 due to the RMF 108 produced in the main winding (M). The one or more additional windings (A) of the stator 102 produces the alternating EMF 110 which is induced in the one or more additional windings (A) due to the rotation of the rotor 104. The main winding (M) and the one or more additional windings (A) may include single-core wires or multi-core wires.

The alternating EMF 110 produced in the one or more additional windings (A) is then harvested, manipulated and fed back simultaneously to the main winding (M) of the stator 102 throughout the complete rotation cycle of the rotor 104 through the ECU 112 coupled to the stator 102. The energy (alternating EMF 110) thus produced during the rotation of the rotor 104 meets a major part of the energy requirement of the induction motor 100, as the induction motor 100 partly functions as a generator.

Constructional and operational details related to the stator (102) and the rotor (104) are further described in conjunction with FIG. 2, FIG. 3, FIG. 4, FIG. 5, FIG. 6 and FIG. 7.

The alternating EMF 110 produced in the one or more additional windings (A) of the stator 102 is fed to the ECU 112. The ECU 112 converts AC voltage of the main AC power supply 106 and the alternating EMF 110 produced in the one or more additional windings (A) to respective DC powers. A resultant DC power is obtained by adding the respective DC powers.

The resultant DC power is then converted to the resultant AC output power 116 by circuitry in the ECU 112. The ECU 112 then feeds the resultant AC output power 116 to the main winding (M) of the stator 102. Thus, the stator 102 is continuously supplied only with the resultant AC output power 116.

The control device 114 is pivotal to the functioning of the ECU 112. The control device 114 controls the supply power/energy (RMF 108) required for rotating the rotor 104 and for driving the load 118 by providing the required torque, frequency, and power (alternating EMF 110) generated by the rotor 104 while it is rotating. The control device 114 is located either within the ECU 112 or is external to the ECU 112. The control device 114 may include, but need not be limited to, a microcontroller, a digital signal processor (DSP), or a microprocessor or a network operated computing device external to the ECU 112.

The main AC power supply 106 provides power to the ECU 112, which in turn carries out its functions and provides the required power or torque to the induction motor 100 for driving the load 118. The energy required to develop the torque is provided collectively by the main power line of the main AC power supply 106 and the alternating EMF 110 generated in the one or more additional windings (A) of the stator 102 due to the rotation of the rotor 104.

Figure 8A:
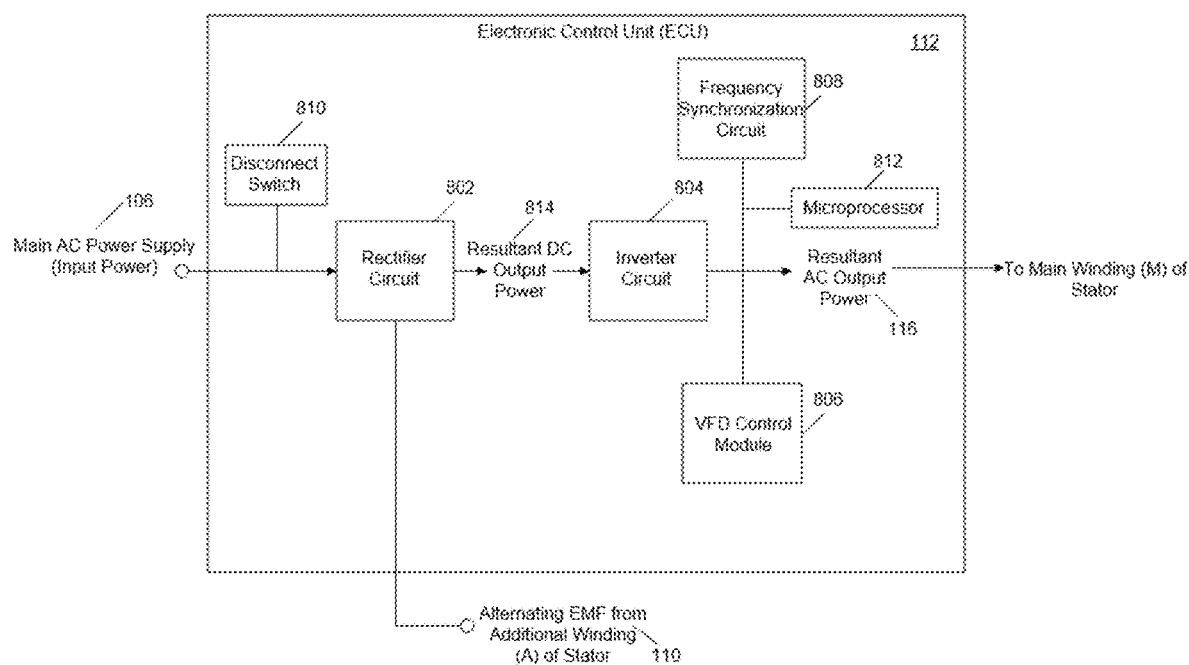
FIG. 8A is a schematic of an electronic control unit (ECU) for harvesting power/energy generated in an additional winding of the stator of an energy efficient induction motor in accordance with an exemplary embodiment of the invention.
Figure 8B:
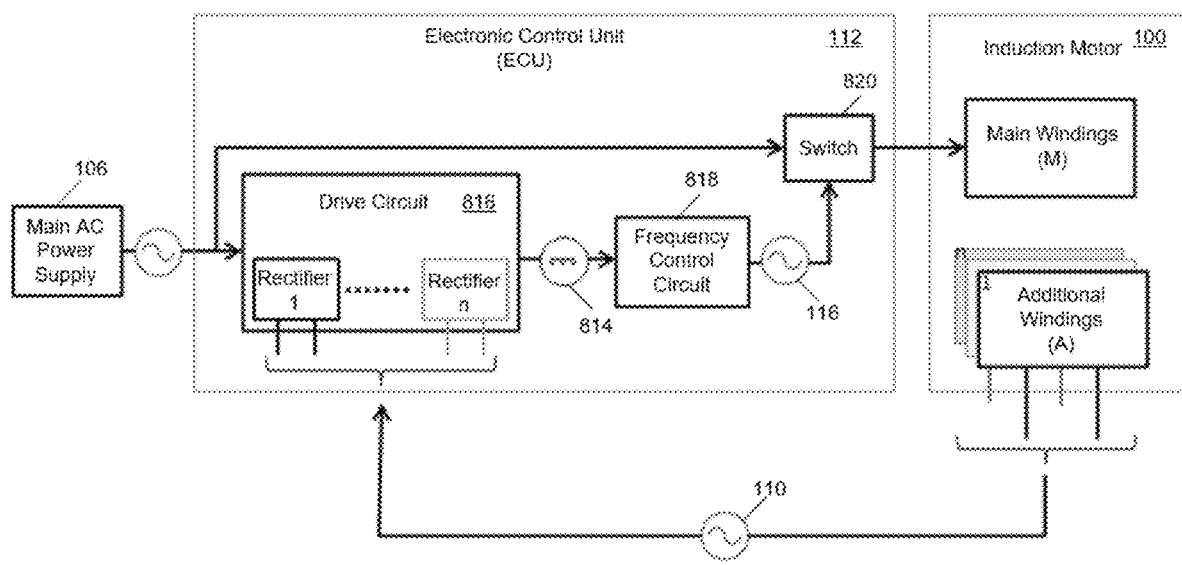
FIG. 8B is a simplified schematic of an ECU for harvesting power/energy generated in multiple windings of the stator of an energy efficient induction motor in accordance with an exemplary embodiment of the invention.
Figure 9:
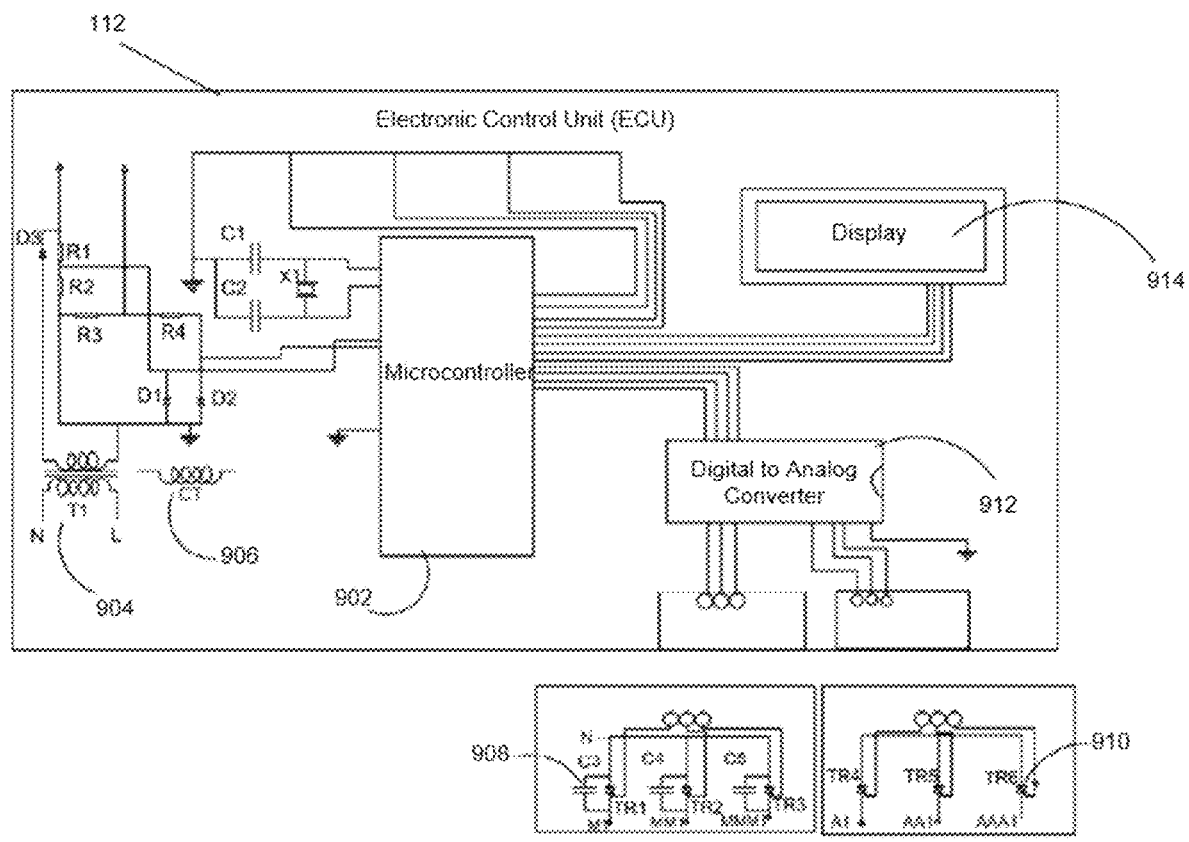
FIG. 9 is a schematic of an ECU for controlling a supply power/energy for producing a torque for driving a load of an energy efficient induction motor in accordance with an exemplary embodiment of the invention.

Various embodiments of the ECU 112 are further described in conjunction with FIG. 8 and FIG. 9. As described in further detail below, the ECU 112 may include multiple functional parts and components. In the alternative, or in addition, multiple ECUs may be utilized with the induction motor 100.

Figure 2:
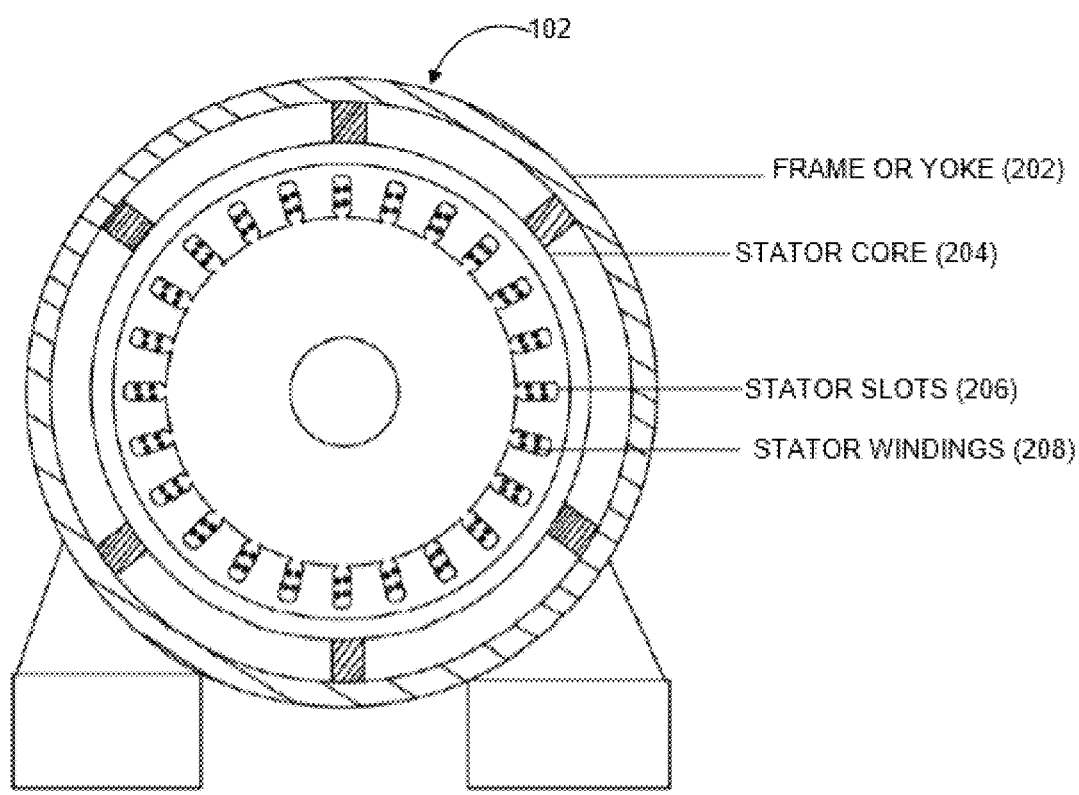
FIG. 2 is a diagrammatic representation of a stator of an energy efficient induction motor in accordance with an exemplary embodiment of the invention.

FIG. 2 is a diagrammatic representation of a stator of an energy efficient induction motor in accordance with an exemplary embodiment of the invention. Referring to FIG. 2, there is shown the stator 102, which includes a frame or yoke 202, a stator core 204, stator slots 206 and stator windings 208.

The frame or yoke 202 is made of close-grained alloy cast iron or aluminum alloy and forms an integral part of the stator 102. A main function of the frame or yoke 202 is to provide a protective cover for other sophisticated components or parts of the induction motor 100.

The stator core 204 is made up of laminations which include the stator slots 206 that are punched from sheets of electrical grade steel. The space provided in the stator slots 206 is sufficient to accommodate the stator windings 208 that include one or more sets of winding wires. In related aspects, the space provided in the stator slots 206 may be more than in conventional slots. The winding wires are insulated wires like the ones used in conventional motors. The size of the stator slots 206 may be adjusted and maintained for uniform distribution of the stator windings 208.

The space provided in the stator slots 206 is configured to accommodate the one or more sets of winding wires which include the main winding (M) which carries the supply power/energy (RMF 108) required for rotating the rotor 104 and the one or more additional windings (A) which is used for transmission of the power (alternating EMF 110) induced in the one or more additional windings (A) while the rotor 104 is rotating. The energy (alternating EMF 110) produced during the rotation of the rotor 104 meets part of the energy requirement of the induction motor 100, as the induction motor 100 partly functions as a generator.

Further, the stator 102 includes rabbets and bore that are machined carefully to ensure uniformity of air gap. A shaft and bearings used in the stator 102 of the induction motor 100 are like any other conventional induction motor. A ball bearing of suitable size is used to reduce rotational friction and support radial and axial loads. A fan is provided to enable adequate circulation of air to cool the stator windings 208. The heat produced in the induction motor 100 is comparatively less because of less current consumption and due to mutually opposite working of the stator windings 208 namely, the main winding (M) corresponding to supply power/energy (RMF 108) required for rotating the rotor 104 and the one or more additional windings (A) corresponding to transmission of the power (alternating EMF 110) generated in the one or more additional windings (A) while the rotor 104 is rotating. Therefore, a size of the cooling fan can also be reduced, thus saving some energy on that count. The bearings are housed at the end of the shaft and are fixed to the frame or yoke 202.

A number of poles and a number of windings that will be required for the stator 102 is decided based on the speed of the induction motor 100 as the synchronous speed is directly proportional to frequency and inversely proportional to the number of poles according to the equation, Ns=120f/P, wherein 'Ns' is the synchronous speed, 'f' is the frequency and 'P' is the number of poles.

In accordance with an exemplary embodiment of the invention, the stator 102 is provided with a total of 24 slots as required for 6 poles, each pole having 4 slots as depicted in FIG. 1. Every slot is provided with a set of two winding wires, the main winding (M) corresponding to supply power/energy (RMF 108) required for rotating the rotor 104 and the one or more additional windings (A) corresponding to transmission of the power (alternating EMF 110) generated in the one or more additional windings (A) while the rotor 104 is rotating. Respective terminal ends of these windings are connected to the ECU 112.

Figure 3:
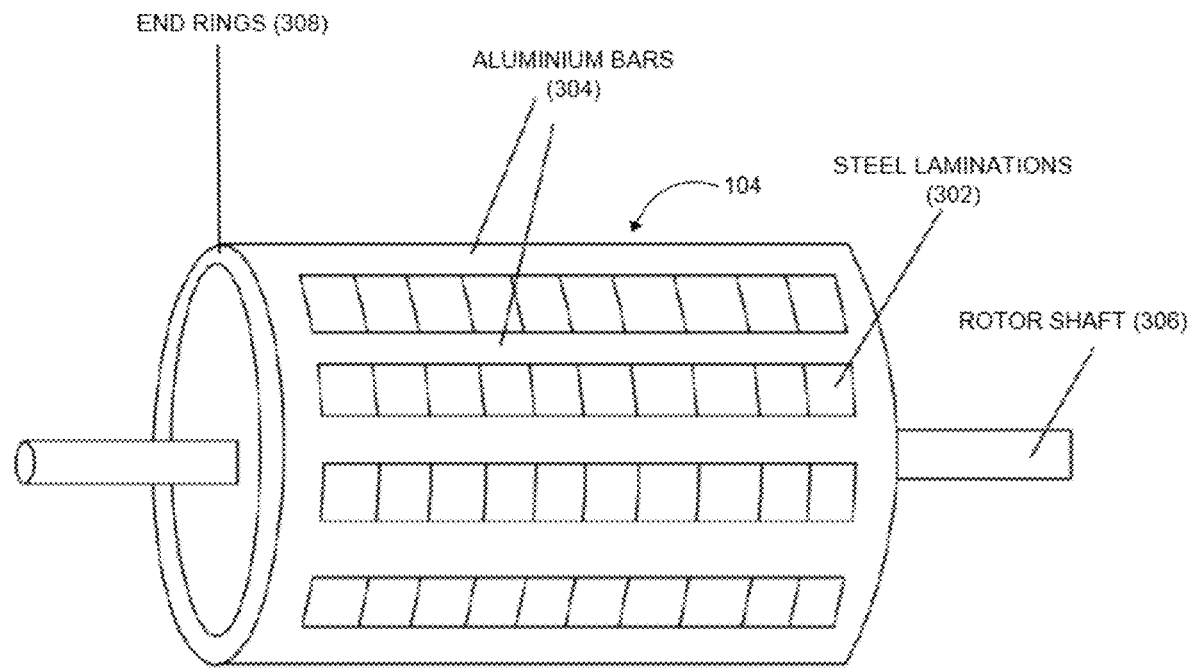
FIG. 3 is a diagrammatic representation of a rotor of an energy efficient induction motor in accordance with an exemplary embodiment of the invention.

FIG. 3 is a diagrammatic representation of a rotor of an energy efficient induction motor in accordance with an exemplary embodiment of the invention. Referring to FIG. 3, there is shown the rotor 104 which includes steel laminations 302, aluminum bars 304, a rotor shaft 306 and end rings 308.

In this particular embodiment, the rotor 104 is a squirrel cage type rotor. The rotor 104 includes a cylinder of the steel laminations 302, with the aluminum bars 304 for separating the steel laminations 302 of the rotor 104. In some embodiments, the rotor 104 may include highly conductive metal (typically aluminum or copper) embedded into its surface, parallel or approximately parallel to the rotor shaft 306 and close to the surface of the rotor 104. At both ends of the rotor 104, rotor conductors are short-circuited by the continuous end rings 308 of similar materials to that of the rotor conductors. The rotor conductors and their end rings 308 by themselves form a complete closed circuit.

When an alternating current is run through the stator windings 208, the RMF 108 is produced. This induces a current in the rotor windings, which produces its own magnetic field. The interaction of the magnetic fields produced by the stator and rotor windings produces a torque on the rotor 104.

The RMF 108 induces voltage in the rotor bars which causes short-circuit currents to start flowing in the rotor bars. These rotor currents generate their self-magnetic field which interacts with the RMF 108 of the stator 102. The rotor field will try to oppose its cause, which is the RMF 108. Therefore, the rotor 104 starts following the RMF 108. The moment the rotor 104 catches up with the RMF 108, the rotor current drops to zero as there is no more relative motion between the RMF 108 and the rotor 104. Hence, when the rotor 104 experiences zero tangential force, the rotor 104 decelerates for the moment. After deceleration of the rotor 104, the relative motion between the rotor 104 and the RMF 108 is reestablished, and consequently, a rotor current is induced again. Thus, the tangential force for rotation of the rotor 104 is restored again, and the rotor 104 starts rotating again following the RMF 108. In this way, the rotor 104 maintains a constant speed which is less than the speed of the RMF 108 or the synchronous speed (Ns).

Figure 4:
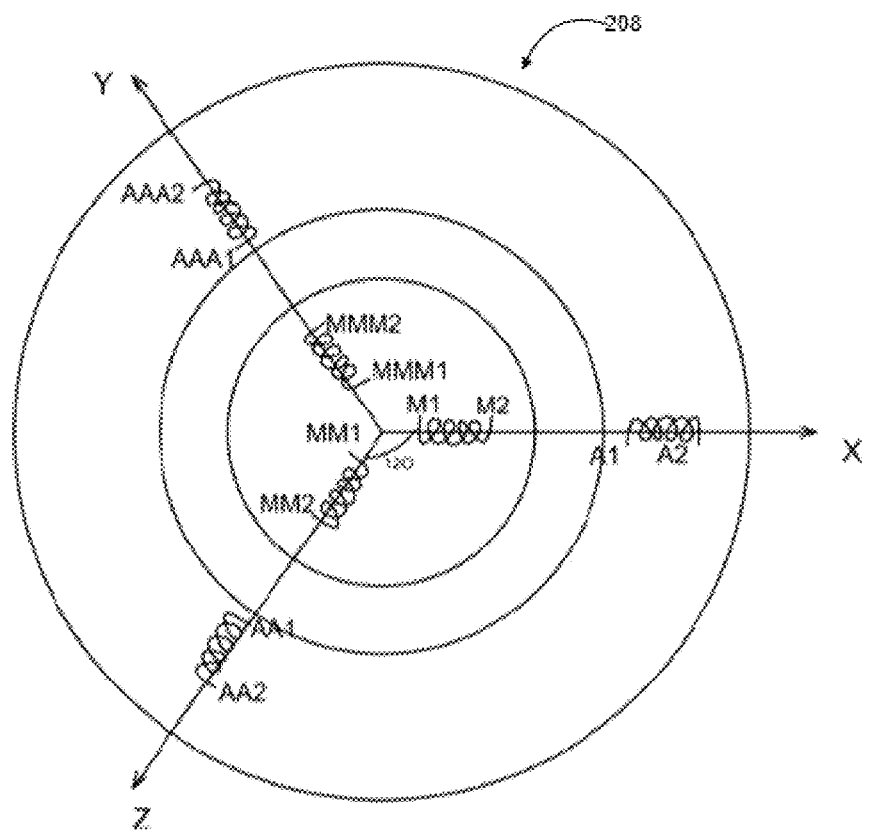
FIG. 4 is a diagrammatic representation of stator windings of an energy efficient induction motor depicting the terminals in accordance with an exemplary embodiment of the invention.

FIG. 4 is a diagrammatic representation of stator windings of an energy efficient induction motor depicting the terminals in accordance with an exemplary embodiment of the invention. Referring to FIG. 4, there is shown the stator windings 208 that include motor winding terminals (supply power input) of phase I of a first set of windings (M1, M2), motor winding terminals (supply power input) of phase II of a second set of windings (MM1, MM2), motor winding terminals (supply power input) of phase III of a third set of windings (MMM1, MMM2), motor winding terminals (alternating EMF output) of phase I of the first set of windings (A1, A2), motor winding terminals (alternating EMF output) of phase II of the second set of windings (AA1, AA2) and motor winding terminals (alternating EMF output) of phase III of the third set of windings (AAA1, AAA2).

M1 & M2, MM1 & MM2 and MMM1 & MMM2 refer to two ends of each winding coil of the stator 102 that correspond to supply power/energy (RMF 108) required for rotating the rotor 104. A1 & A2, AA1 & AA2 and AAA1 & AAA2 refer to two ends of the respective winding coil of the stator 102 in the same set that corresponds to transmission of the alternating EMF 110, which is the power generated in the one or more additional windings (A) of the stator 102 while the rotor 104 is rotating.

The winding connections inside the induction motor 100 are as follows in accordance with an exemplary embodiment of the invention.

M1, MM1 and MMM1, each carrying the main AC power supply 106 are connected to the ECU 112. M2, MM2 and MMM2 are joined together so as to form a star connection as depicted in FIG. 4.

A1, AA1 and AAA1, each carrying the alternating EMF 110 are connected to the ECU 112. A2, AA2 and AAA2 are joined together so as to form a star connection as shown in FIG. 4.

Figure 5:
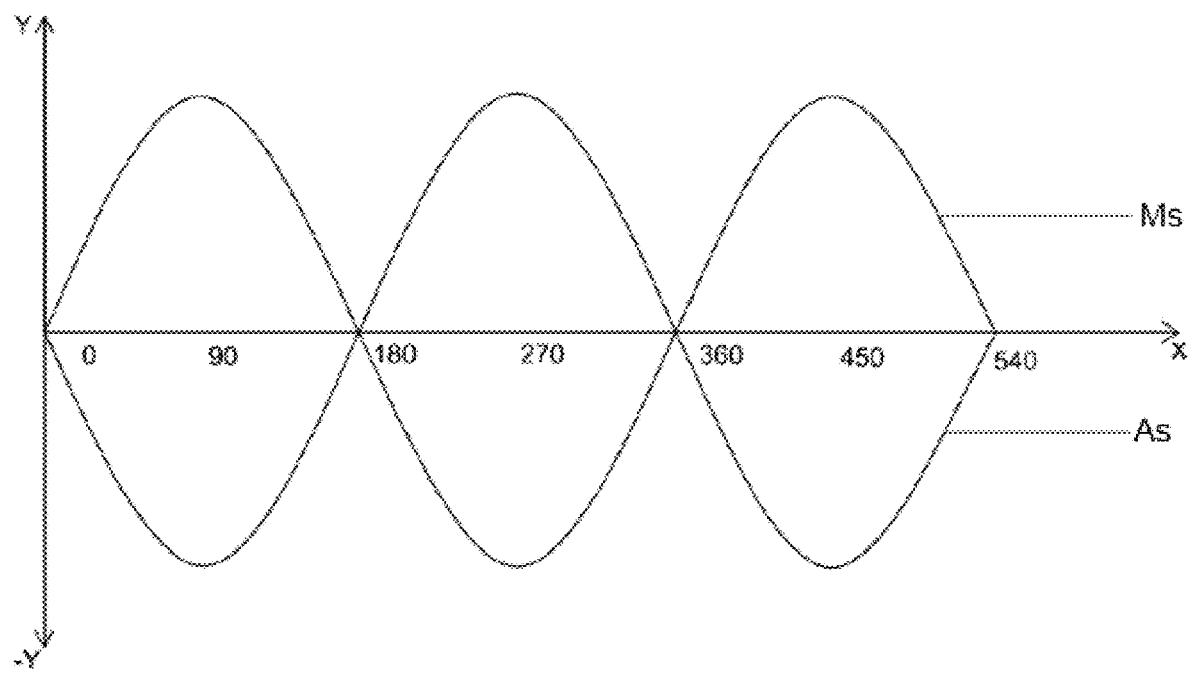
FIG. 5 is a graphical representation of the power generated in a set of stator windings in accordance with an exemplary embodiment of the invention.

FIG. 5 is a graphical representation of the power generated in a set of stator windings in accordance with an exemplary embodiment of the invention. Referring to FIG. 5, there is shown a graphical representation of sine waves, wherein $M_s$ depicts a sine wave corresponding to supply power/energy (RMF 108) carried by the main winding (M) of the stator 102 for rotating the rotor 104 and $A_s$ depicts a sine wave corresponding to the alternating EMF 110 which is generated in the one or more additional windings (A) of the stator 102 due to the rotation of the rotor 104.

Figure 6:
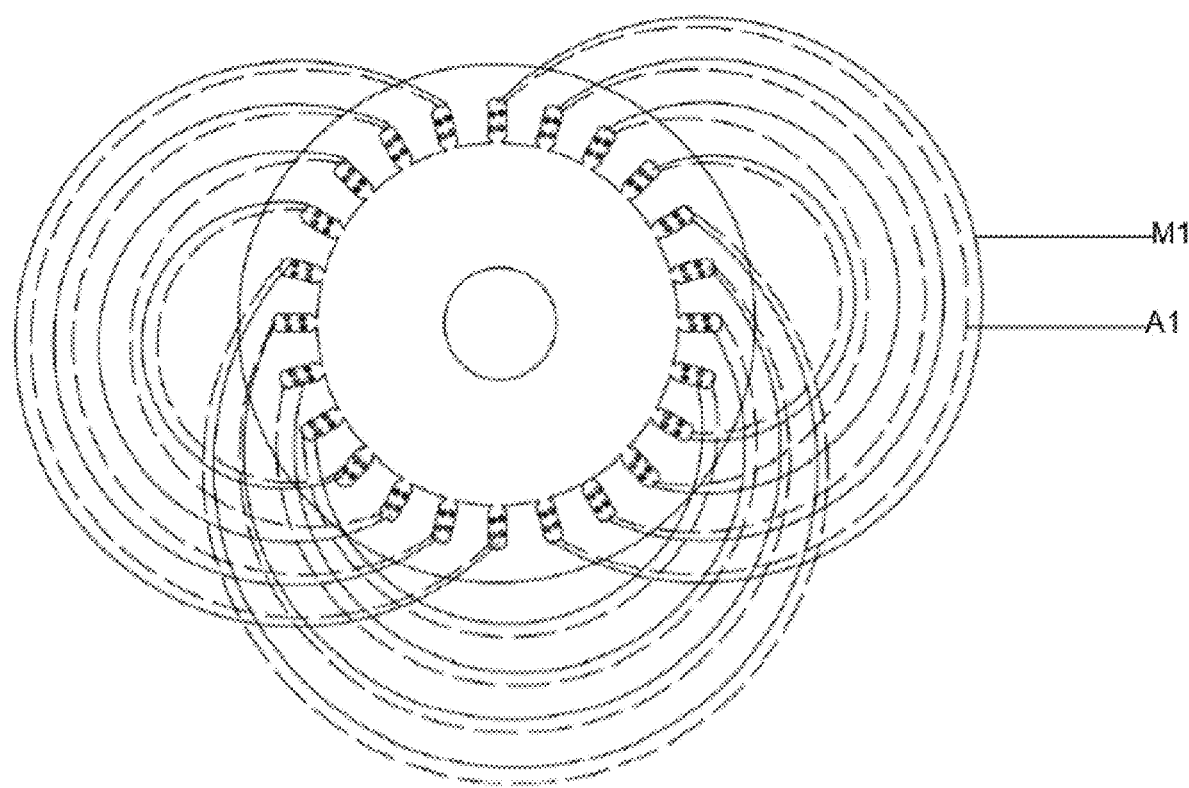
FIG. 6 is a diagram depicting flux distribution in a set of stator windings in accordance with an exemplary embodiment of the invention.

FIG. 6 is a diagram depicting flux distribution in a set of stator windings in accordance with an exemplary embodiment of the invention. Referring to FIG. 6, there is shown a rotating magnetic flux M1 produced in the main winding (M) of the stator 102 and an alternating flux A1 produced in the one or more additional windings (A) of the stator 102.

The rotating magnetic flux M1 is produced in the main winding (M) of the stator 102 for producing the torque for driving the rotor shaft 306 of the induction motor 100. The alternating flux A1 produces/generates the alternating EMF 110 in the one or more additional windings (A) of the stator 102. The rotating magnetic flux M1 and the alternating flux A1 are in phase and are in mutually opposite directions. These fluxes are distributed 120 degrees apart.

Figure 7:
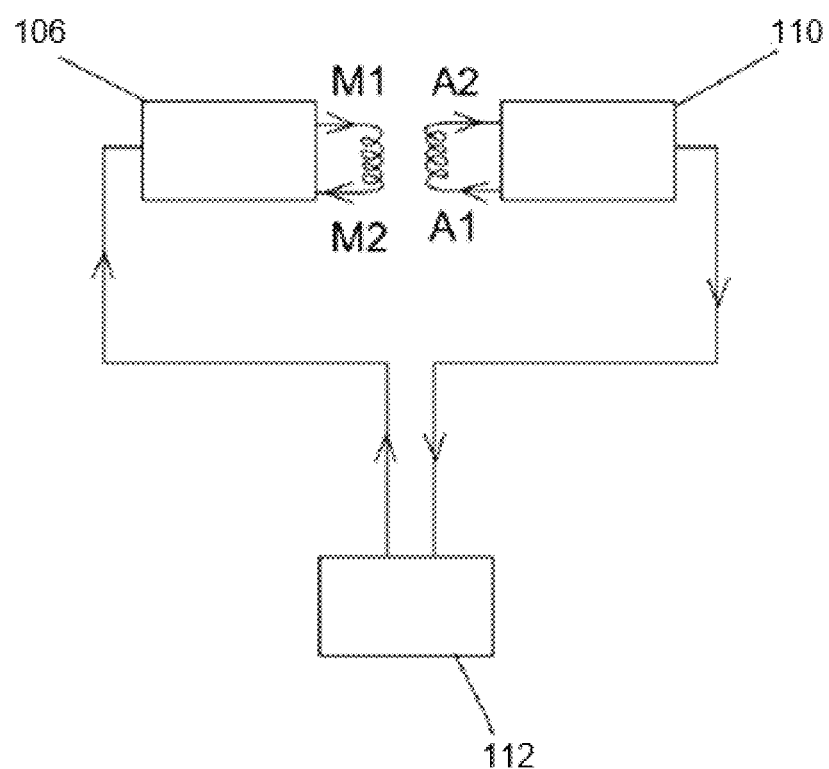
FIG. 7 is a diagram depicting power line distribution of an energy efficient induction motor in accordance with an exemplary embodiment of the invention.

FIG. 7 is a diagram depicting power line distribution of an energy efficient induction motor in accordance with an exemplary embodiment of the invention. Referring to FIG.

7, there is shown the main AC power supply 106 as power input, the ECU 112 and the alternating EMF 110 as generated power output.

As depicted in FIG. 7, it is assumed that one rotation is divided into two equal segments/sectors which represents one full rotation of the induction motor 100. While the rotor 104 starts rotating, it draws power from the main AC power supply 106 (input power) and simultaneously generates/produces the alternating EMF 110 as the power output.

FIG. 8A is a schematic of an ECU for harvesting power/energy generated in an additional winding of the stator of an energy efficient induction motor in accordance with an exemplary embodiment of the invention. Referring to FIG. 8A, there is shown the ECU 112 which includes a rectifier circuit 802, an inverter circuit 804, a Variable Frequency Drive (VFD) control module 806, a frequency synchronization circuit 808, a disconnect switch 810 and a microprocessor 812.

The rectifier circuit 802 includes one or more rectifiers for converting AC voltage of the main AC power supply 106 and the alternating EMF 110 produced in the additional winding (A) of the stator 102 to respective DC powers. A resultant DC power 814 is obtained by adding the respective DC powers, which is then fed to the inverter circuit 804.

The inverter circuit 804 includes one or more inverters for converting the resultant DC power 814 to the resultant AC output power 116.

The VFD control module 806 is configured to vary voltage and frequency of the resultant AC output power 116.

The frequency synchronization circuit 808 is configured to synchronize frequency of the resultant AC output power 116 with the frequency of the main AC power supply 106. The resultant AC output power 116 is then fed to the main winding (M) of the stator 102 from the ECU 112.

At this stage, the disconnect switch 810 is configured to disconnect the main AC power supply 106 to the main winding (M) of the stator 102, and consequently the main winding (M) of the stator 102 is continuously supplied with only the resultant AC output power 116.

The microprocessor 812 is configured to compute a phase difference in voltage and current by measuring a time difference between voltage peak and current peak, upon loading the induction motor 100.

FIG. 8B is a simplified schematic of an ECU for harvesting power/energy generated in multiple windings of the stator of an energy efficient induction motor in accordance with an exemplary embodiment of the invention. Referring to FIG. 8B, there is shown the ECU 112 which includes a drive circuit 816, a frequency control circuit 818 and a switch 820.

The drive circuit 816 includes rectifiers 1-n for converting AC voltage of the main AC power supply 106 and the alternating EMF 110 produced in the multiple additional windings (A) 1-n of the stator 102 to respective DC powers. The alternating EMF 110 produced in each additional winding of the multiple additional windings (A) is fed to a corresponding rectifier of the drive circuit 816 for conversion to respective DC powers. For instance, rectifier 1 converts the alternating EMF 110 produced in the additional winding 1 to respective DC power, rectifier 2 converts the alternating EMF 110 produced in the additional winding 2 to respective DC power, rectifier n converts the alternating EMF 110 produced in the additional winding n to respective DC power and so on.

The resultant DC power 814 is obtained by adding the respective DC powers, which is then fed to the frequency control circuit 818 to produce the resultant AC output power 116.

The frequency control circuit 818 is configured to synchronize frequency of the resultant AC output power 116 with the frequency of the main AC power supply 106. The resultant AC output power 116 is then fed to the main windings (M) of the stator 102 from the ECU 112. At this stage, the switch 820 is configured to disconnect the main AC power supply 106 to the main windings (M) of the stator 102, and consequently the main windings (M) of the stator 102 is continuously supplied with only the resultant AC output power 116.

FIG. 9 is a schematic of an ECU for controlling a supply power/energy for producing a torque for driving a load of an energy efficient induction motor in accordance with an exemplary embodiment of the invention. Referring to FIG. 9, there is shown the ECU 112 which includes a microcontroller 902, a step-down transformer 904, a current transformer (CT) coil 906, a capacitor bank (C3, C4, C5) 908, a TRIAC (TR1, TR2, TR3, TR4, TR5, TR6) 910, a digital to analog converter 912, and a display 914.

The microcontroller 902 is pivotal to the functioning of the ECU 112. The microcontroller 902 controls the supply power/energy (RMF 110) required for rotating the rotor 104 and for controlling the torque, frequency, and power (alternating EMF 110) generated by the rotor 104 while it is rotating for driving the load 118. A bridge rectifier (not shown in the figure) is used to convert AC supply voltage to the microcontroller 902 to DC voltage for the working of the microcontroller 902.

The step-down transformer 904 provides power exclusively meant for the working of the ECU 112. The main power line (phase) of the main AC power supply 106 to the induction motor 100 is connected to the step-down transformer 904 of the ECU 112 as well as to the stator windings 208, and neutral line of the main AC power supply 106 is connected to the ECU 112 as well as to a terminal box of the induction motor 100.

The CT coil 906 of a current sensing transformer measures the input current and stabilizes the current. The output of the CT coil 906 is connected to the microcontroller 902. The input of the current sensing transformer is connected to the line/input voltage for sensing the current and the output of the current sensing transformer is connected to the microcontroller 902.

The capacitor bank 908 includes a plurality of capacitors (C3, C4, C5), each capacitor of the plurality of capacitors (C3, C4, C5) having its own value of capacitance. The capacitor bank 908 is used for balancing the load 118 of the induction motor 100 and stabilizes power input to the induction motor 100 and power factor (PF) of the main power line.

The TRIAC 910 enables switching (ON/OFF) functionality to select a capacitor of the plurality of capacitors (C3, C4, C5) from the capacitor bank 908 for providing power to the induction motor 100 based on load requirements of the induction motor 100. The switching functionality of the TRIAC is controlled by the control device 114 which, in this case, is the microcontroller 902. While the induction motor 100 is running at different loads, based on the load requirements, the TRIAC 910 selects a required capacitance from the capacitor bank 908. The switching of the TRIAC 910 controls the load 118 and the input current to the induction motor 100.

While the rotor 104 starts rotating, the rotor 104 draws power from the main AC power supply 106 and simultaneously induces the alternating EMF 110 in the one or more additional windings (A) of the stator 102. The current consumption is measured by the CT coil 906 and this current is provided to the ECU 112. The current is then passed onto the microcontroller 902 which is programmed to activate the TRIAC 910 based on the load 118, which in turn actuates the TRIAC 910 so as to select and connect a specific capacitor from the plurality of capacitors (C3, C4, C5) in the capacitor bank 908 having different ratings provided therein to suit the torque requirements. For example, for a 1 HP motor, value of the capacitance chosen will be 15 to 20 μf.

The digital to analog converter 912 is an integrated circuit (IC) provided therein to which the output of the microcontroller 902 is connected. The digital to analog converter 912 converts a digital output signal of the microcontroller 902 into an analog signal, which in turn is given to the TRIAC 910. Thus, the TRIAC 910 controls the load 118 of the induction motor 100.

In accordance with an exemplary scenario, the TRIAC 910 selects a capacitor, say C3, from the capacitor bank 908 having capacitors of varying capacitance based on the quantum of load 118 the induction motor 100 is subjected to, which is reflected in terms of amperage which is measured by the CT coil 906.

In accordance with the scenario, once the induction motor 100 is powered on, the connection is made to capacitor C3 by means of switching TRIAC 1 provided in the ECU 112 and the induction motor 100 starts rotating and simultaneously generates the alternating EMF 110 in the one or more additional windings (A) provided in the stator 102. As the load 118 increases, TRIAC 2 activates the capacitor C4. When the load increases further, TRIAC 3 will activate capacitor C5 and so on. In this way, the load 118 of the induction motor 100 is balanced.

The display 914 provided in the ECU 112 shows the voltage, current, frequency and the power consumption of the induction motor 100 at different loads.

In various other embodiments, the ECU 112 is also provided with overload protection, short circuit protection and overheat tripping arrangement.

The present invention is advantageous in that it provides an energy efficient induction motor that has wide industrial applicability due to its reliability in performance compared to other conventional AC motors. The energy efficient induction motor reduces the consumption of electricity to a large extent and provides monetary benefits in agricultural sectors, locomotive sectors, and other industries which widely use induction motors.

The energy efficient induction motor of the present invention consumes less current, by implementing an exclusively designed electronic module coupled with a tailor-made stator winding design, for ensuring higher current efficiency.

The present invention provides an energy efficient induction motor which consumes less current, compared to the conventional motor of the same capacity because of the implementation of the winding provided in the stator, which is capable of generating definite EMF (alternating EMF) while the motor is rotating, so that part of the power requirement for driving the motor is met while running the motor. The disclosed invention also makes it possible to use a single-phase induction motor instead of a three-phase induction motor, without compromising on the input power requirement.

Further, the single-phase induction motor built using the disclosed invention has lower electrical, magnetic and heat losses as compared to the three-phase induction motor for the same output requirement. Also, magnetic and heat losses are less compared to the three-phase induction motor of the same output power requirement.

Those skilled in the art will realize that the above recognized advantages and other advantages described herein are merely exemplary and are not meant to be a complete rendering of all of the advantages of the various embodiments of the present invention.

The present invention may be realized in hardware, or a combination of hardware and software. The present invention may be realized in a centralized fashion, in at least one computer system, or in a distributed fashion, where different elements may be spread across several interconnected computer systems. A computer system or other apparatus/devices adapted to carry out the methods described herein may be suited. A combination of hardware and software may be a general-purpose computer system with a computer program that, when loaded and executed on the computer system, may control the computer system such that it carries out the methods described herein. The present invention may be realized in hardware that comprises a portion of an integrated circuit that also performs other functions. The present invention may also be realized as a firmware which form part of the media rendering device.

The present invention may also be embedded in a computer program product, which includes all the features that enable the implementation of the methods described herein, and which when loaded and/or executed on a computer system may be configured to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present invention is described with reference to certain embodiments, it will be understood by those skilled in the art that various changes may be made, and equivalents may be substituted without departure from the scope of the present invention. In addition, many modifications may be made to adapt a particular situation or material to the teachings of the present invention without departure from its scope. Therefore, it is intended that the present invention is not limited to the particular embodiment disclosed, but that the present invention will include all embodiments that fall within the scope of the appended claims.

What is claimed is:

1. An induction motor, comprising:
   a stator comprising a main winding configured to generate a rotating magnetic field (RMF) in response to the main winding of the stator receiving a resultant AC output power; and
   a rotor disposed to rotate relative to the main winding of the stator due to the RMF,
   wherein the stator further comprises one or more additional windings, wherein rotation of the rotor induces an alternating EMF in the one or more additional windings of the stator, wherein the alternating EMF produced in the one or more additional windings is fed back to the main winding of the stator throughout the complete rotation cycle of the rotor through an electronic control unit (ECU) coupled to the stator, wherein the ECU comprises:
   a rectifier circuit for converting AC voltage of a main AC power supply to a first DC power and for converting the alternating EMF produced in the one or more additional windings to a second DC power, wherein a resultant DC power is obtained by adding the first DC power and the second DC power; and an inverter circuit for converting the resultant DC power to the resultant AC output power, wherein the ECU is configured to feed the resultant AC output power to the main winding of the stator.

2. The induction motor of claim 1, wherein the stator is made up of laminations comprising a plurality of stator slots, each stator slot of the plurality of stator slots comprising one or more sets of winding wires, each set including a main winding and one or more additional windings, wherein the main winding is supplied with the power required for rotating the rotor and the one or more additional windings enable transmission of the alternating EMF produced in the one or more additional windings due to rotation of the rotor.

3. The induction motor of claim 2, wherein size of a stator slot in the stator is configured to accommodate the one or more additional windings, wherein the size is configured to facilitate uniform distribution of the winding wires.

4. The induction motor of claim 2, wherein respective terminal ends of the main winding and the one or more additional windings are connected to the ECU.

5. The induction motor of claim 1, wherein the ECU comprises a step-down transformer for providing power for working of the ECU.

6. The induction motor of claim 5, wherein main power line of the main AC power supply to the induction motor is connected to the step-down transformer of the ECU and the main winding of the stator, and wherein neutral line of the main AC power supply is connected to the ECU and a terminal box of the induction motor.

7. The induction motor of claim 1, wherein the ECU comprises a Variable Frequency Drive (VFD) control module configured to vary voltage and frequency of the resultant AC output power.

8. The induction motor of claim 1, wherein the ECU comprises a frequency synchronization circuit configured to synchronize frequency of the resultant AC output power with frequency of the main AC power supply and feed the resultant AC output power to the main winding of the stator.

9. The induction motor of claim 8, wherein the ECU is configured to disconnect the main AC power supply to the main winding of the stator through a disconnect switch, wherein the main winding of the stator is continuously supplied with only the resultant AC output power.

10. The induction motor of claim 1, wherein the ECU comprises a microprocessor configured to compute a phase difference in voltage and current by measuring a time difference between voltage peak and current peak, upon loading of the induction motor.

11. The induction motor of claim 1, wherein the ECU further comprises:

a capacitor bank comprising a plurality of capacitors, each capacitor of the plurality of capacitors having its own value of capacitance, wherein the capacitor bank balances a load of the induction motor and stabilizes power input to the induction motor and power factor (PF) of main power line; and a TRIAC for enabling ON/OFF switching functionality to select a capacitor of the plurality of capacitors from the capacitor bank for providing power to the induction motor based on load requirements of the induction motor.

12. The induction motor of claim 11, wherein a control device is configured to control the ON/OFF switching functionality of the TRIAC.

13. The induction motor of claim 12, wherein the control device is located within the ECU or is external to the ECU, wherein the control device is at least one of a microcontroller, a digital signal processor (DSP), a microprocessor or a network operated computing device.

14. The induction motor of claim 12, wherein the ECU comprises a current transformer (CT) coil for controlling and measuring the input current to the induction motor and stabilizing the input current, wherein output of the CT coil is connected to the control device.

15. The induction motor of claim 14, wherein the capacitor bank comprises a plurality of capacitors of varying capacitance based on a quantum of load the induction motor is subjected to, wherein the quantum of load is reflected in terms of amperage measured by the CT coil.

16. The induction motor of claim 12, wherein the ECU comprises a digital to analog converter connected to an output of the control device for converting a digital output signal of the control device into an analog signal, which is then fed to the TRIAC.

* * * * *